United States Patent

Hollatz et al.

[11] Patent Number: 6,061,347
[45] Date of Patent: May 9, 2000

[54] ACD WITH PACKET DATA BASED AGENT INTERCONNECT

[75] Inventors: Michael C. Hollatz, Huntley; Timothy P. Werve, Geneva; Laird C. Williams, St. Charles, all of Ill.

[73] Assignee: Rockwell Semiconductor Systems, Inc., Newport Beach, Calif.

[21] Appl. No.: 09/034,604

[22] Filed: Mar. 3, 1998

[51] Int. Cl.[7] .................................................. H04L 12/66
[52] U.S. Cl. ...................... 370/352; 379/93.01; 379/265; 379/309
[58] Field of Search ..................................... 370/351, 352, 370/353, 354, 355, 356; 379/93.01, 93.14, 219, 220, 227, 258, 260, 265, 308, 309; 395/200.68, 200.72

[56] References Cited

U.S. PATENT DOCUMENTS

| | | |
|---|---|---|
| 3,792,361 | 2/1974 | Sordello et al. . |
| 4,627,047 | 12/1986 | Pitroda et al. . |
| 4,737,983 | 4/1988 | Frauenthal et al. . |
| 5,036,535 | 7/1991 | Gechter et al. ........................ 379/210 |
| 5,193,110 | 3/1993 | Jones et al. ........................... 379/93.14 |
| 5,268,903 | 12/1993 | Jones et al. . |
| 5,452,350 | 9/1995 | Raynolds et al. ....................... 379/220 |
| 5,528,678 | 6/1996 | Kaplan ..................................... 379/201 |
| 5,530,744 | 6/1996 | Charalambous et al. ............... 379/265 |
| 5,546,452 | 8/1996 | Andrews et al. ........................ 379/219 |
| 5,612,730 | 3/1997 | Lewis . |
| 5,737,983 | 4/1998 | Frauenthal et al. ..................... 379/221 |
| 5,768,360 | 6/1998 | Reynolds et al. ....................... 379/220 |
| 5,778,060 | 7/1998 | Otto ......................................... 379/265 |
| 5,848,143 | 12/1998 | Andrews et al. ........................ 379/219 |
| 5,862,211 | 1/1999 | Roush ..................................... 379/309 |
| 5,878,130 | 3/1999 | Andrews et al. ........................ 379/265 |
| 5,884,032 | 3/1999 | Bateman et al. .................... 395/200.34 |

*Primary Examiner*—Ajit Patel
*Assistant Examiner*—Bob A. Phunkulh

[57] ABSTRACT

A method and apparatus for providing a voice path between a customer call connection received from a public switched telephone network at a switch of an automatic call distributor and an agent of the automatic call distributor at a remote location from the automatic call distributor and also a data connection between a terminal of the agent and a host of the automatic call distributor. The method includes the steps of setting up a dedicated telephone connection through the public switched telephone network between the automatic call distributor and agent at the remote location and establishing a voice internet protocol communication link between the automatic call distributor and agent through the dedicated connection for exchange of voice information between the customer and agent. The method further includes the step of establishing a data link between a database application of the host and a database application of the terminal of the agent through the dedicated connection.

4 Claims, 1 Drawing Sheet

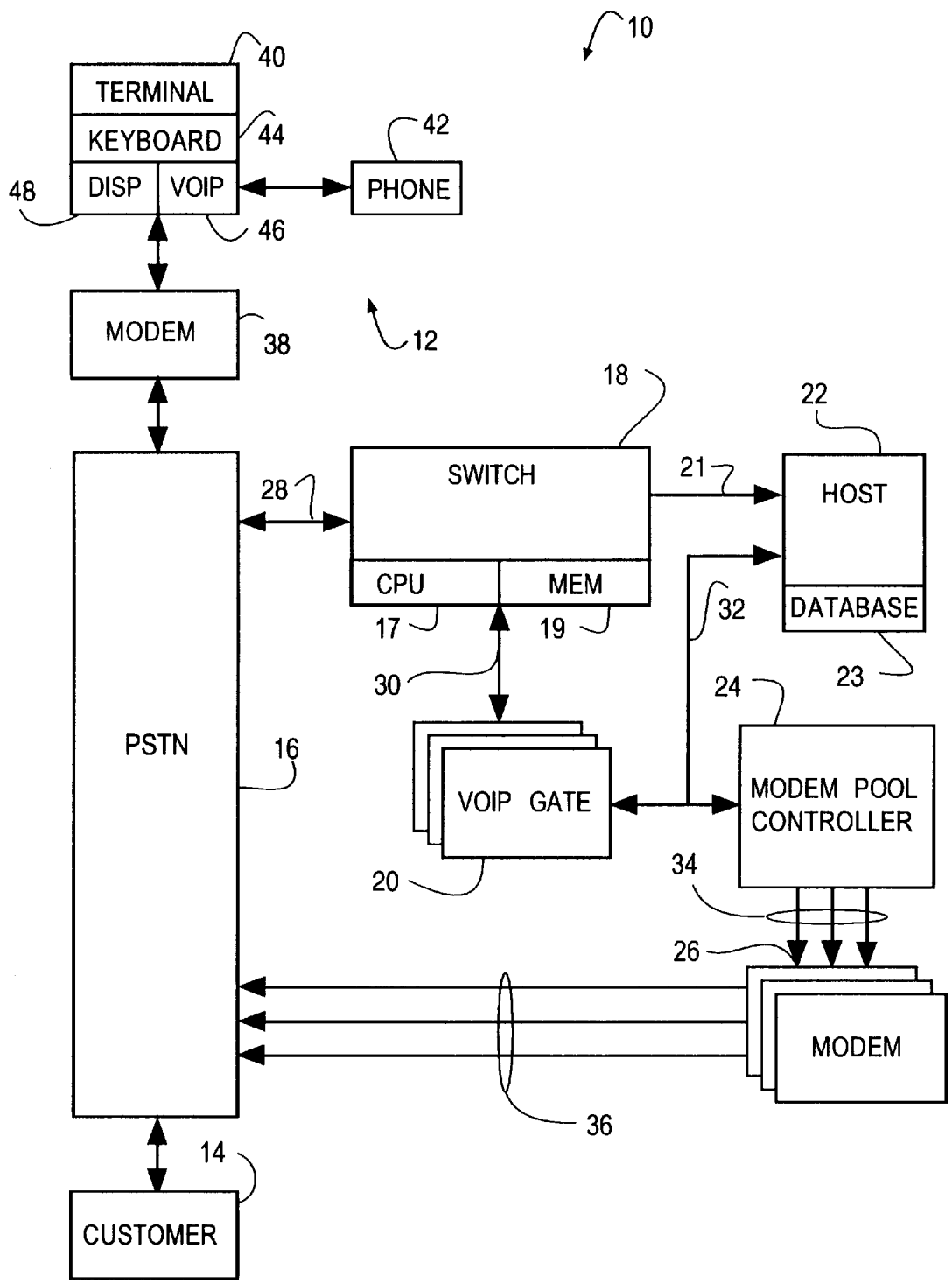

ACD WITH PACKET DATA BASED AGENT INTERCONNECT

FIELD OF THE INVENTION

The field of the invention relates to automatic call distributors and more particularly to automatic call distributors using internet protocols for voice and data exchange.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the ACD may distribute the calls based upon which agent position (telephone) has been idle the longest.

In order to distribute incoming calls from the PSTN to the available agents, the interaction of a controlling computer with a switching fabric of the ACD becomes essential. Often a connection of the ACD to a local PSTN is in the form of a number of trunk connections. Each of the trunk connections is monitored by the controller for incoming calls. Where a call is detected, the controller searches for and selects an idle agent. Upon selecting an agent, the controller instructs the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer a call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

As a further feature, calls may be transferred among agents. Where a first agent finds that he or she cannot help a particular customer, the agent may activate a key on a keyboard of the agent and may enter an identity of another agent or agent group that may be better able to help the customer. The controller of the ACD may immediately connect the call to the newly identified agent, or may place the call in a queue until the identified agent becomes available.

In either case, the controller transfers a message to the host identifying the previous and newly identified agent. Since the host knows the identity of the customer displayed at the terminal of the previous agent, the host may now display those same customer records at the terminal of the newly selected agent.

Where a call is placed in a queue, the ACD controller may monitor a total time that the call has been in the queue. Where the time exceeds a threshold value, the controller may transfer (overflow) the call to a newly selected agent at another less heavily loaded ACD (overflow ACD) within the same organization. The controller of the transferring ACD transfers DNIS and ANI information as well as a call sequence number assigned by the transferring ACD to the overflow ACD. The overflow ACD, upon receiving the call, transfers the information to the host including an indication that the call is an overflow call. The host in turn then polls each ACD to identify the transferring ACD and any newly created call records created by the transferring ACD.

While the existing method of ACD operation is relatively satisfactory, it is dependent upon a relatively close proximity of agents to the ACD and ready access to voice and data interconnections. Where an agent is not located proximate the ACD, two voice channels may be required for the agent to converse with the customer and also receive data from the host. The first voice channel may be dedicated to the exchange of voice information. A second voice channel may be used by a modem to exchange data with the host. The use of two voice channels is expensive and inefficient. Accordingly, a need exists for an improved method of providing voice and data connections between ACDs and remotely located agents.

SUMMARY

A method and apparatus for providing a voice path between a customer call connection received from a public switched telephone network at a switch of an automatic call distributor and an agent of the automatic call distributor at a remote location from the automatic call distributor and also a data connection between a terminal of the agent and a host of the automatic call distributor. The method includes the steps of setting up a dedicated telephone connection through the public switched telephone network between the automatic call distributor and agent at the remote location and establishing a voice internet protocol communication link between the automatic call distributor and agent through the dedicated connection for exchange of voice information between the customer and agent. The method further includes the step of establishing a data link between a database application of the host and a database application of the terminal of the agent through the dedicated connection.

BRIEF DESCRIPTION OF THE DRAWINGS

FIG. 1 is a block diagram of one exemplary embodiment of an automatic call distribution system using voice internet protocols and a dedicated agent connection in accordance with an embodiment of the invention.

DETAILED DESCRIPTION OF AN EMBODIMENT

FIG. 1 is a block diagram of an exemplary embodiment of an automatic call distribution ACD system 10 in accordance with the invention. Under the embodiment, the ACD 10 may receive a call from a customer 14 through the PSTN 16 and route the customer call to an agent at a remote agent location 12 using an internet protocol and a dedicated telephone connection between the ACD 10 and agent location 12. The use of the internet protocol over the dedicated connection allows data and voice packets to share the same telephone connection in a non-interfering manner with a much higher bandwidth utilization of the telephone connection.

Under one illustrated embodiment, the ACD 10 includes a switch 18, a host computer 22, a number of voice internet protocol (VOIP) gates 20, a modem pool controller 24 and a number of modems 26. The switch 18 may be interconnected to the PSTN 16 through one or more T1 lines 28. Similarly, the VOIP gates 20 may be interconnected to the switch through one or more T1 lines 30.

In operation, the channels of T1 lines 28 connecting the switch 18 and PSTN 16 may be associated with particular ports of the switch 18. Similarly, the VOIP gates 20 may also be associated with particular ports of the switch 18. A memory 19 is provided within the switch 18 for purposes of providing a reference as to which port of the switch 18 is connected to a particular VOIP gate 20 or incoming trunk line 28 from the PSTN 16.

The host 22, VOIP gates 20 and modem pool controller 24 may be interconnected as a local area network (LAN). As such, communication may occur between the host 22, VOIP gates 20 and modem pool controller 24 over the LAN connection 32 using a TCP/IP format. The switch 18 may be interconnected with the host 22 through an appropriate data link 21 (e.g., leased lines, virtual private lines, microwave link, the Internet, digital packet switching, etc.).

The modem pool controller 24 may control and provide an interface with one or more modems 26. A parallel interconnect 34 may be provided between the modem pool controller 24 and each of the modems 26.

The network side of each modem 26 may be individually connected by outgoing telephone lines 36 to the PSTN 16 as shown in FIG. 1. Alternatively, the output of each modem 26 may be routed to individual ports of the switch 18, to further reduce the need for external telephone connections and telephone charges.

The PSTN 16 may offer standard telephone service on the trunk lines 28 in association with services such as ANI and DNIS. Call control, call maintenance, and call set-up may be accomplished by in-band signalling over the trunk line itself or over an associated control channel.

DNIS information from the PSTN 16 may be useful to the ACD 10 where inbound calls are be directed to any of a large block of telephone numbers assigned to individual departments of the organization using the ACD 10. This may be especially useful where the block of numbers to the switch 18 is connected through the trunk lines 28 in rotary fashion, so that when the calling party from the PSTN appears, for example, on a first trunk, it can be determined whether the calling party was, in fact, calling the telephone number corresponding to the first trunk or was, in fact, calling the telephone number corresponding to a second trunk and was rotated down to the next available trunk.

With regard to the agent station 12, the agent may be provided with an audio interface (e.g., telephone handset 42) for conversing with customers 14 through a terminal 40 and ACD 10. A modem 38 may be provided as an interface of the terminal 40 with the ACD 10 through the PSTN 16. A keyboard 44 and display 48 is provided on the terminal 40 for exchange of data with a database 23 of the ACD 10 through the terminal 40.

Present within the terminal 40 is a voice internet protocol (VOIP) application 46 allowing for concurrent voice and data traffic through the terminal 40. The VOIP application 46 provides a voice plug within the terminal 40 which may be addressed by VOIP applications at other locations (e.g., a VOIP application operating from within a VOIP gateway 20). The VOIP applications within the VOIP gateway 20 and terminal 40 may be any of a number of available internet products (e.g., WebPhone by NetSpeak, WebTalk by Quarterdeck, Intercom by Telescape, NetPhone by Electric Magic, Global Phone by Internet, etc.).

With regard to inbound calls, the switch 18 functions to selectively interconnect calls from external customer units 14 of the external PSTN 16 to agents associated with the ACD 10. While each agent (e.g., 12) may be shown in terms of a single agent, it may be assumed that the agent position 12 of FIG. 1 may be one of many agents (each situated at a different remote location) and associated with the ACD 10 through the PSTN 16.

Further, under one illustrated embodiment of the invention, it may be assumed that an agent (e.g., 12) may be associated with any port of its associated switch (e.g., 18). How the agent 12 becomes initially connected to a port of that switch will be explained later.

The switch 18 is controlled by a central processing unit, or CPU 17, in conjunction with a peripheral memory device 18. Control of the switch 18 and communications with the host 22 and PSTN 16 may be accomplished generally as described in U.S. Pat. No. 5,268,903, and U.S. Pat. No. 5,140,611, both to Jones, and both incorporated herein by reference. Routing and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPU 17 monitors each port of the switch 18 for changes in status. A change in status may be an agent unit 12 hanging up after a call, or it may be a call alerting tone detected on a trunk 28 alerting the CPU 17 to the presence of an incoming call.

Where the status change is an agent 12 hanging up, the CPU 17 acts to tear-down the call connection within the switch 18 between the agent at a first port of the switch and a second party to the conversation, communicating through a second port of the switch 18. Upon tear down of the connection, the CPU 17 also sends a message to the host, notifying the host of termination of the call connection. The message to the host 22 would include at least the identity of the agent 12.

Where the status change is a call alert signal on an incoming trunk line (or control channel associated with the incoming trunk line), then the CPU 17 may send an acknowledge message to the PSTN 16 accepting the call. The PSTN 16 may respond with the forwarding of DNIS and ANI messages, identifying the called and calling party.

Upon accepting the call, the CPU 17 first stores the DNIS and ANI numbers in a termination table of the memory 18. More specifically, the CPU 17 maintains a table of call information for each port of the switch 18. Where a call is accepted on an incoming trunk line, the CPU 17 enters the DNIS and ANI number into the table for the incoming trunk line upon which the call is received.

In addition to updating the termination table within memory 18, the CPU 17 also generates a call identifier (also sometimes referred to as a call ID or sequence number) for the call, unique to the switch 18. The call identifier along with the ANI and DNIS numbers may then be sent to the host 22 as part of a call arrival message. Delivery of the ANI and DNIS numbers and call identifier allows the host 22 to create a unique call record for the call in memory 23, in a call record area of memory 23 reserved for the switch 18. The call record may be used to retrieve customer records for delivery to an appropriate display terminal 40 once the call has been assigned to an agent 12.

The CPU 17 then, by reference to the DNIS number, determines the identity of agent 12 to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

In preparation for completing the call connection, the CPU 17 may transfer an identifier of the agent and call ID to the host 22. In response, the host 22 may take steps to set up a dedicated call connection between the ACD 10 and agent 12.

In preparation for setting up the dedicated call connection, the host 22 transfers a telephone number of the agent 12 to the modem pool controller 24 along with a LAN address to be assigned by the modem controller 24 to the call (i.e., to a selected modem). The host 22 also selects a VOIP gate 20 and transfers a voice plug address of the selected VOIP gate 20 to the modem pool controller 24 for use with the call. The host 22 also transfers the assigned LAN address of the modem to the selected VOIP gate 20.

The modem pool controller 24 maintains an addressing table for each modem 26, based upon its use. The addressing table may be used by the modem pool controller 24 in routing packets of data both to and from selected modems of the modem pool.

After selecting a modem for the call, the modem pool controller 24 stores the assigned LAN address in the addressing table of the selected modem 26. The modem pool controller 24 also stores the voice plug address of the selected VOIP gate 20 in the addressing table of the selected modem 26.

Upon receipt of the telephone number of the agent 12, the modem pool controller 24 transfers the telephone number of the agent 12 to the selected modem 26. The controller then causes the selected modem 26 to go off-hook and transfer the telephone number of the agent 12 from the selected modem 26 to the PSTN 16.

Upon receipt of the telephone number of the agent 12, the PSTN 16 sends a call alert to the agent 12. Upon detecting the call alert signal, the modem 38 of the agent terminal 40 goes off-hook to answer the call.

To complete the call connection, the host 22 transfers an identifier (e.g., a port address) of the selected VOIP gate 20 to the switch 18 along with instructions to connect the call from customer 14 to the port of the selected VOIP gate 20. The switch 18, in turn, forms an internal connection between the incoming call from the customer 14 and the selected VOIP gate 20.

Upon completion of voice connection from the customer 14 to the selected VOIP gate 20, the VOIP gate 20 may begin sending voice packets over the dedicated connection to the VOIP application 46 within the terminal 40. The VOIP gate 20 is able to route voice packets to the selected modem 26 based upon the LAN address of the modem assigned by the host 22 and transferred to the VOIP gate 20 from the host 22 during call setup. Voice packets received from the agent 12 through the modem 26 are routed to the selected VOIP gate 20 based upon the voice plug address stored in the addressing table of the selected modem 26.

At the agent terminal 40, voice packets received over the dedicated connection from the ACD 10 are converted into audible sound and routed to the handset 42 by the VOIP application 46. Similarly, voice information from the handset 42 is converted into voice packets and transferred through the dedicated connection to the selected modem 26, where they are routed based upon the voice plug address of the selected VOIP gate 20 stored in the addressing table of the selected modem 26.

Concurrent with the setup of the voice connection between the customer 14 and agent 12 through the dedicated connection, the host 22 also delivers customer information to the display 48 of the agent terminal 40. The host 22 identifies the customer information based upon the call ID received from the switch 18 and call record previously stored in the database 23. Upon identifying the customer records, the host 22 transfers the customer records over the dedicated connection to the agent terminal 40.

To route the customer records to the terminal 40, the host sends an information packet over the LAN connection 32 to the selected modem 26 using the LAN address previously assigned by the host 22. The modem pool controller 24 routes the packet through the selected modem 26 and dedicated connection to the terminal 40.

Upon receiving the information packet of customer records, the terminal displays the records upon the display 48 at the same time as call arrival through the VOIP application 46. The agent may modify the customer records through the keyboard 44 or request additional records through the database 23 of the host 22. The terminal 40 may address data packets to the host 22 based upon a source address of the host 22 contained in a header of the delivered customer records.

In another embodiment of the invention, the host 22 performs a predictive analysis of agent loading and functions to begin setup of the dedicated connection between the ACD 10 and agents 12 before an actual need exists. Such analysis may be based upon maintaining a reserve of idle agents 12 for a short period of time before assignment of a call from a customer 14 to an agent 12. As part of the predictive analysis effort, the host 22 maintains a table of agents in the database 23, with agents assigned to calls based upon how long the agent has been idle. Where the idle period falls below a threshold, the host 22 acts to add more agents to the table.

To add an agent, the host goes to a reserve agent table within the database 23 and recovers a telephone number of the agent 12. Upon recovering the telephone number of the agent from the reserve table, the host 22 transfers the number to the modem pool controller 24 along with a LAN identifier of the agent. Once the dedicated connection is set up, the agent is added to the table of agents and assigned the next call, as described above.

In another embodiment of the invention, the idle period threshold value may be reduced by reducing the time for creating the dedicated connection. Reducing the time for setup of the dedicated connection may allow call setup between the ACD 10 and a remote agent 12 to occur in real time without the requirement that the host 22 maintain a reserve of idle agents.

Reducing the time of call setup may be accomplished under one embodiment by fixing a speed of modem operation. Under the embodiment, the modems 26, 38 are programmed to operate at a speed of 33.8 kHz.

Specific embodiments of methods and apparatus of providing a telecommutable platform according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of providing a voice path between a customer call connection received from a public switched telephone network at a switch of an automatic call distributor and an agent of the automatic call distributor at a remote location from the automatic call distributor and also a data path between a terminal of the agent and a host of the automatic call distributor, such method comprising the steps of:

receiving a call from the customer at a first port of the switch of the automatic call distributor along with an ANI and DNIS number of the call from the public switched telephone network;

determining which agent should handle the call based upon the ANI and DNIS numbers;

transferring a telephone number of the determined agent to a modem of the automatic call distributor;

transferring the telephone number of the agent from the modem of the automatic call distributor to the public switched telephone network for setup of a dedicated call connection between the modem of the automatic call distributor and modem of the terminal of the agent;

setting up the dedicated telephone connection through the public switched telephone network between the automatic call distributor and agent at the remote location;

establishing a call connection between the voice application of the automatic call distributor and the customer through the call switch of the automatic call distributor;

transferring a local area identifier of the voice application of the automatic call distributor to a controller of the modem of the automatic call distributor and an identifier of the modem of the automatic call distributor to the voice application of the automatic call distributor;

providing a voice application within the terminal of the agent which operates between the dedicated connection and an audio speaker and microphone of the agent and which converts between voice internet protocol of the dedicated connection and audible information of the agent;

establishing a voice internet protocol communication link between the automatic call distributor and agent through the dedicated connection for exchange of voice information between the customer and agent; and establishing a data link between a database application of the host and a database application of the terminal of the agent through the dedicated connection.

2. The method of providing a voice and data path as in claim 1 wherein the step of establishing a voice internet protocol communication connection between a voice application of the automatic call distributor and a voice application of a terminal of the agent further comprises instructing the switch of the automatic call distributor to form a call connection between the call from the customer at the first port of the switch and a second port of the switch providing a connection to the voice application of the automatic call distributor.

3. Apparatus for providing a voice path between a customer call received from a public switched telephone network at a switch of an automatic call distributor and an agent of the automatic call distributor at a remote location from the automatic call distributor and also a data path between a terminal of the agent and a host of the automatic call distributor, such apparatus comprising:

means for receiving a call from the customer at a first port of the switch of the automatic call distributor along with an ANI and DNIS number of the call from the public switched telephone network;

means for determining which agent should handle the call based upon the ANI and DNIS numbers;

means for retrieving a telephone number of the determined agent from a lookup table;

means for transferring the retrieved telephone number of the determined agent to a modem of the automatic call distributor;

means for transferring the telephone number of the determined agent from the modem of the automatic call distributor to the public switched telephone network for setup of a dedicated call connection between the modem of the automatic call distributor and modem of the terminal of the agent;

means for setting up the dedicated telephone connection between the automatic call distributor and agent;

means for providing voice internet protocol processing which operates between the switch and dedicated connection and which converts between voice information of the customer call and voice internet protocol of the agent through the dedicated connection;

means for establishing a call connection between the means for providing voice internet protocol processing of the automatic call distributor and the customer through the switch of the automatic call distributor;

means for transferring a local area identifier of the voice application of the automatic call distributor to a controller of the modem of the automatic call distributor and an identifier of the modem of the automatic call distributor to the voice application of the automatic call distributor;

means for providing voice internet protocol processing within the terminal which operates between the dedicated connection and the agent and which converts voice information of the agent to voice internet protocol information of the dedicated connection;

means for establishing a voice internet protocol communication link between the automatic call distributor and agent through the dedicated connection for exchange of voice information between the customer and agent; and means for establishing a data link between a database application of the automatic call distributor and a database application of the terminal of the agent through the dedicated connection.

4. The apparatus for providing a voice and data path as in claim 3 wherein the means for establishing a voice internet protocol communication connection between a voice application of the automatic call distributor and a voice application of a terminal of the agent further comprises means for instructing the switch of the automatic call distributor to form a call connection between the call from the customer at the first port of the switch and a second port of the switch providing a connection to the voice application of the automatic call distributor.

* * * * *